Figure 1:
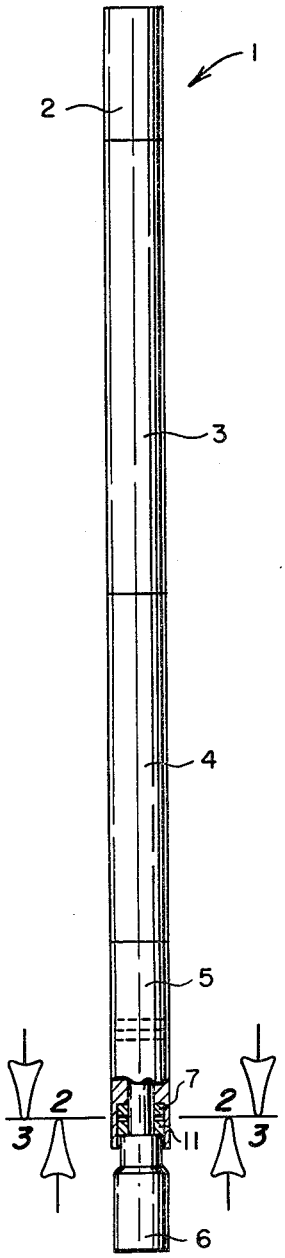
Figure 2:
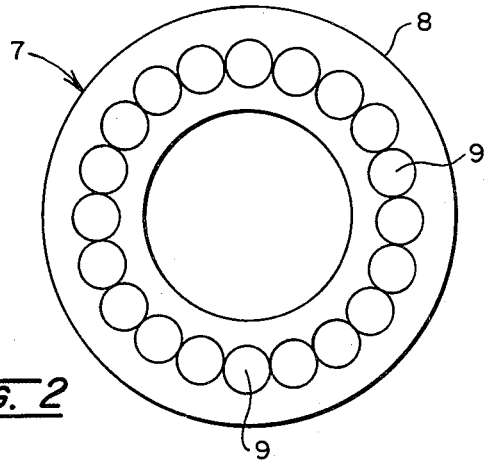
Figure 3:
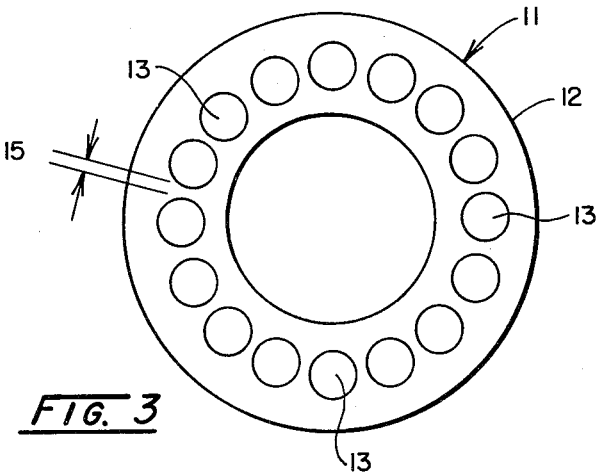
Figure 4:
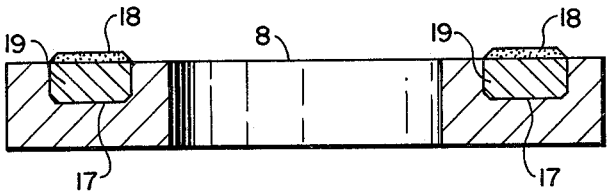

United States Defensive Publication [19] (H) [11] T102,901

Offenbacher [43] Apr. 5, 1983

[54] METHOD OF FABRICATING A BEARING

[76] Inventor: Larry A. Offenbacher, 4421 Castleton Rd., West, Columbus, Ohio 43220

[21] Appl. No.: 298,271

[22] Filed: Aug. 31, 1981

[51] Int. Cl.[3] ..... B21D 53/10

[52] U.S. Cl. ..... 29/149.5 R; 29/149.5 NM; 308/DIG. 8; 384/95

[57] ABSTRACT

The mating halves 7 and 11 of a new type of thrust bearing for a down hole drilling motor 1 are fabricated by a technique which ensures that the composite diamond compact inserts 9 or 13 are coplanar with each other. Composite compacts are utilized having a chamfer on both the diamond table 18 and the substrate 19. These hard inserts are inserted into recesses 17 in steel bearing body rings 8 or 12, said recesses being the same depth as the substrate. The composite compacts are furnace brazed below the degradation temperature of the diamond. During brazing a weight is placed on the compacts to maintain their coplanar relationship. The space between the inserts 15 is maintained at less than half their diameter. This fabrication technique results in a smooth running, low friction thrust bearing for rotating equipment.

9 Claims, 1 Sheet Drawing,

10 Pages Specification

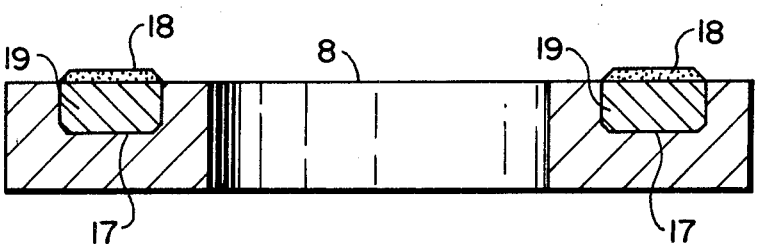

The file of this unexamined application may be inspected and copies thereof may be purchased (849 O.G. 1221, Apr. 9, 1968).